United States Patent
Li (10) Patent No.: US 11,677,313 B2
(45) Date of Patent: Jun. 13, 2023

(54) METHOD AND DEVICE FOR SWITCHING FREQUENCY MODULATION IN INTERLEAVED POWER FACTOR CORRECTION FOR ONBOARD CHARGING APPLICATIONS

(71) Applicant: Vitesco Technologies USA, LLC, Auburn Hills, MI (US)

(72) Inventor: Michael J Li, Troy, MI (US)

(73) Assignee: Vitesco Technologies USA, LLC, Auburn Hills, MI (US)

( * ) Notice: Subject to any disclaimer, the term of this patent is extended or adjusted under 35 U.S.C. 154(b) by 338 days.

(21) Appl. No.: 17/019,597

(22) Filed: Sep. 14, 2020

(65) Prior Publication Data

US 2022/0085714 A1    Mar. 17, 2022

(51) Int. Cl.
  *H02M 1/42* (2007.01)
  *H02J 7/04* (2006.01)
  *H02M 3/04* (2006.01)
  *H02M 1/14* (2006.01)
  *B60L 53/00* (2019.01)

(52) U.S. Cl.
  CPC .......... *H02M 1/4208* (2013.01); *B60L 53/00* (2019.02); *H02J 7/04* (2013.01); *H02M 1/14* (2013.01); *H02M 3/04* (2013.01); *H02J 2207/20* (2020.01)

(58) Field of Classification Search
  None
  See application file for complete search history.

(56) References Cited

U.S. PATENT DOCUMENTS

2019/0207517 A1* 7/2019 Karlsson ............. H02M 3/1584
2020/0295649 A1* 9/2020 Ashourloo ............ H02M 3/335

\* cited by examiner

*Primary Examiner* — Jared Fureman
*Assistant Examiner* — Aqeel H Bukhari (57) ABSTRACT

An interleaved switched mode power supply and control method therefor are disclosed. The interleaved switched mode power supply includes a first switched mode power supply; a second switched mode power supply; and a controller. The controller controls the first and second switched mode power supplies so that the controller and the first and second switched mode power supplies form an interleaved switched mode power supply with power factor correction. The controller modulates a switching frequency of each of the first and second switched mode power supplies such that the switching frequency varies based upon ripple current cancellation between the ripple current of the first switched mode power supply and the ripple current of the second switched mode power supply.

18 Claims, 6 Drawing Sheets

METHOD AND DEVICE FOR SWITCHING FREQUENCY MODULATION IN INTERLEAVED POWER FACTOR CORRECTION FOR ONBOARD CHARGING APPLICATIONS

FIELD OF INVENTION

The present invention generally relates to onboard charging for a motor vehicle, and particularly to a vehicle onboard charging method and apparatus in which switching frequency modulation is employed in an interleaved switched mode power supplies.

BACKGROUND

Regulatory standards, such as IEC61000-3-2, require devices that draw high power from the AC mains to implement power factor correction (PFC). PFC regulates current draw from the AC mains in proportion to the AC voltage, reducing distortion of the AC sine wave under high load conditions. There are numerous methods and topologies for PFC, almost all of which involve a switch mode power supply (SMPS). SMPSs have an inherent weakness in that the current draw has high frequency ripple coinciding with the switching frequency. This ripple will propagate onto the AC lines in the form of electromagnetic compatibility (EMC) emissions and if not addressed will result in the product failing to meet EMC compliance standards.

The most common method of addressing ripple current is by passive filtering. However because of the high load currents and line voltages, effective filtering requires large and expensive components.

Another method is to increase the switching frequency, which reduces the amplitude of the ripple but increases losses in the switching devices.

One other common method for reducing ripple current is through interleaving where two or more separate SMPSs are used in parallel with their switching waveforms out of phase with each other, with the parallel SMPSs having a phase shift according to the equation Phase Shift=360 degrees/($N$-phases), wherein "N-phases" refers to the number of SMPSs in parallel. For example, two parallel SMPSs are 180 degrees out of phase to each other, and three parallel SMPSs are 120 degrees out of phase to each other. Since the ripple waveform of some of the supplies are rising while others are falling in at least part of the switching waveform, the sum of the ripple current of the phases tend to cancel each other. Because the amount of overlap changes with duty cycle, ripple cancellation is more effective at some duty cycles and less effective at others. For dual interleaved the effect is greatest near 50% duty cycle and least effective near 0 or 100% duty cycle. For other interleaved topologies, the effect is greatest at $D=n/(N\text{-phases})$, where "n" refers to an integer value between one and one less than N-phases.

SUMMARY

Example embodiments overcome deficiencies of known interleaved SMPSs. The example embodiments utilize dynamic switching frequency in an interleaved SMPS apparatus to reduce ripple current generated thereby. By using a faster switching frequency where interleaving is least effective at reducing ripple current and using a slower switching frequency where interleaving is most effective, total switching losses are reduced without increasing the peak ripple current amplitude compared to an interleaved SMPS with a fixed frequency.

According to an example embodiment, an interleaved switched mode power supply includes a plurality of parallel-connected switched mode power supplies, having at least a first switched mode power supply having supply input terminals to receive a supply input voltage, and a second switched mode power supply having supply input terminals to receive the supply input voltage. A controller has at least one first output coupled to at least one control input of the first switched mode power supply, and at least one second output coupled to at least one control input of the second switched mode power supply. The controller is configured to control the first and second switched mode power supplies so that the controller and the first and second switched mode power supplies form an interleaved switched mode power supply with power factor correction. The controller is configured to modulate a switching frequency of each of the first and second switched mode power supplies such that the switching frequency varies based upon ripple current cancellation between the ripple current of the first switched mode power supply and the ripple current of the second switched mode power supply.

In one aspect, the switching frequency of the first and second switched mode power supplies varies based upon duty cycle thereof. The controller is configured to determine the duty cycle of the first and second switched mode power supplies based at least partly upon the supply input voltage, and determine the switching frequency of the first and second switched mode power supplies based upon the determined duty cycle.

The interleaved switched mode power supply further includes a non-transitory memory that is part of or coupled to the controller. The non-transitory memory having stored therein data corresponding to a relationship between duty cycle and switching frequency. The data is in the form of a lookup table or an equation. In one aspect, the determined switching frequency is highest at $D=n/(N\text{-phases}*2)$, where D is duty cycle, "N-phases" is the number of switched mode power supplies, and n are odd integers between one and 2*(N-phases). Further, the determined switching frequency is lowest at $D=n/(N\text{-phases})$ where D is duty cycle, "N-phases" is the number of switched mode power supplies, and n are integers between zero and (N-phases).

In another example embodiment, the interleaved switched mode power supply further includes a third switched mode power supply having supply input terminals to receive the supply input voltage. The controller is configured to modulate the switching frequency of each of the first, second and third switched mode power supplies such that the switching frequency varies based upon ripple current cancellation between the ripple current of the first, second and third switched mode power supplies.

In another example embodiment, the interleaved switched mode power supply forms at least part of an onboard battery charging apparatus for a vehicle.

A method for controlling interleaved switched mode power supplies includes receiving an input supply voltage;

and modulating, by a controller, a switching frequency of the interleaved switched mode power supplies based upon the received input supply voltage.

In one aspect, the method further includes determining, by a controller, a duty cycle for the interleaved switched mode power supplies based upon the received input supply voltage. The controller then determines a switching frequency for the interleaved switched mode power supplies based upon the determined duty cycle. The controller controls the interleaved switched mode power supplies using the determined duty cycle and the determined switching frequency, wherein modulating the switching frequency forms part of controlling the interleaved switched mode power supplies.

Determining the switching frequency includes accessing data stored in non-transitory memory of or associated with the controller which provides a relationship between duty cycle and switching frequency. The data is in the form of a lookup table or an equation.

In one aspect, the determined switching frequency is highest at $$D=n/(N\text{-phases}*2),$$

where D is duty cycle, "N-phases" is the number of switched mode power supplies, and n are odd integers between one and 2*(N-phases). The determined switching frequency is lowest at $$D=n/(N\text{-phases}),$$

where D is duty cycle, "N-phases" is the number of switched mode power supplies, and n are integers between zero and (N-phases).

Another example embodiment is directed to a computer program product stored in non-transitory memory having instructions which, when executed by a controller of an interleaved switched mode power supply, causes the controller to perform a method. The method includes receiving an indication of an input supply voltage; and modulating a switching frequency of the interleaved switched mode power supplies based upon the input supply voltage.

The instructions further include instructions which when executed cause the controller to determine a duty cycle for the interleaved switched mode power supplies based upon the received input supply voltage; determine a switching frequency for the interleaved switched mode power supplies based upon the determined duty cycle; and control the interleaved switched mode power supply using the determined duty cycle and the determined switching frequency, wherein modulating the switching frequency forms part of controlling the interleaved switched mode power supplies.

BRIEF DESCRIPTION OF THE DRAWINGS

Aspects of the invention will be explained in detail below with reference to exemplary embodiments in conjunction with the drawings, in which.

DETAILED DESCRIPTION

The following description of the example embodiment(s) is merely exemplary in nature and is in no way intended to limit the invention, its application, or uses. In the figures and throughout the detailed description, the same reference numbers are used to identify identical or similar elements. For the sake of clarity, the elements are not shown to scale unless otherwise specified.

The example embodiments are generally directed to an interleaved PFC SMPS apparatus in which switching frequency of the apparatus is modulated such that the switching frequency is increased when interleaving is less effective at reducing summed ripple current of the SMPS apparatus and decreased when interleaving is more effective at reducing summed ripple current. Total switching losses of the SMPS apparatus may be reduced without increasing peak summed ripple current compared to summed ripple current of a similarly interleaved SMPS apparatus operating at a fixed switching frequency.

The following description of an interleaved SMPS apparatus will be directed to a dual interleaved SMPS apparatus. It is understood, however, that the interleaved SMPS apparatus is not limited to a dual interleaved SMPS topology and instead may include more than two SMPSs.

Figure 1:
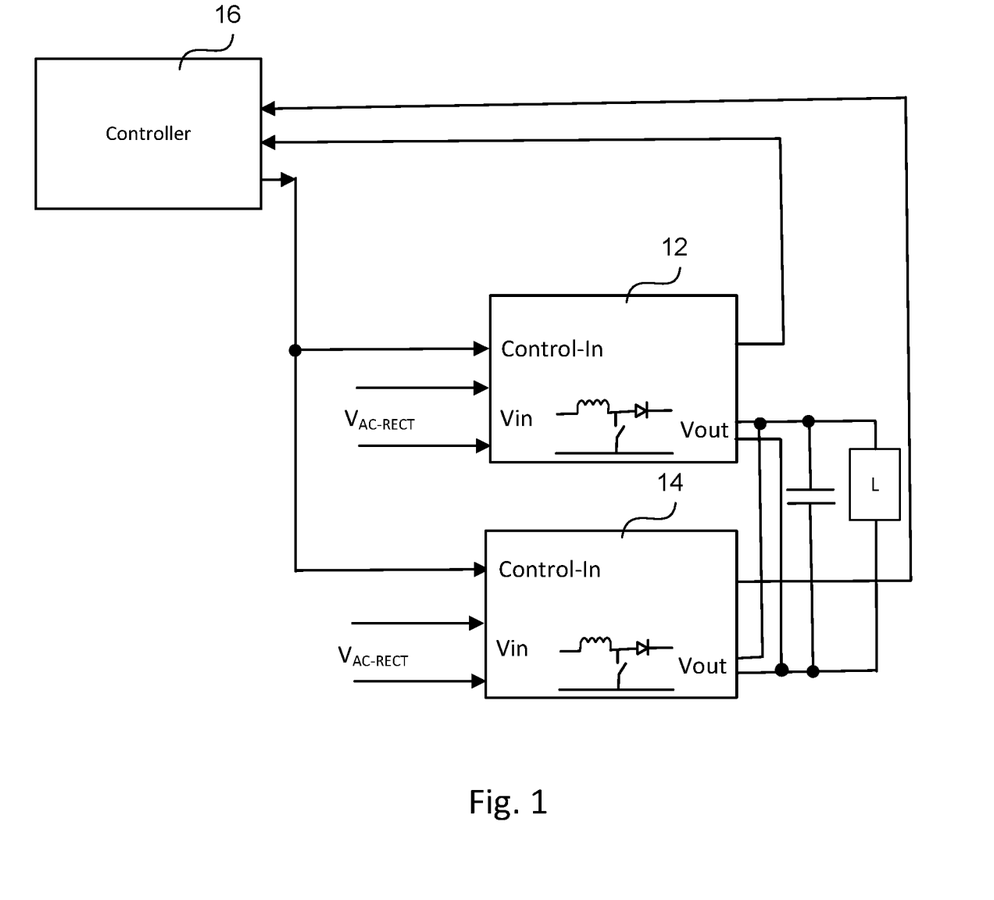
FIG. 1 is a block diagram of a dual interleaved SMPS apparatus according to an example embodiment.

FIG. 1 is a block diagram of a dual interleaved SMPS apparatus 10 according to an example embodiment. As illustrated, SMPS apparatus 10 includes two SMPSs 12, 14. Each SMPS 12, 14 includes input terminals for connection, in this case, to the AC mains. The interleaved SMPS apparatus 10 may form at least part of a PFC block and/or converter circuit. Such PFC block may be combined with a DC-DC converter to serve as a charging system, and particularly an onboard charging system for a motor vehicle. In a vehicle's onboard charging system, SMPS apparatus 10 functions as a boost PFC converter circuit.

In general terms and in one example embodiment, each SMPS 12, 14 includes an inductor having a first terminal, a control switch connected between the first terminal of the inductor and a reference voltage, and a diode connected between the first terminal and the output terminal of the SMPS. It is understood that each SMPS 12, 14 may be implemented using any one of a number of different known topologies and/or architectures.

Dual interleaved SMPS apparatus 10 further includes a controller 16 having inputs for receiving sensed parameters of SMPSs 12, 14 and generates, at control outputs, control signals for controlling SMPSs 12, 14. The control signals may include signals to control the duty cycle and/or switching frequency of SMPSs 12, 14. Controller 16 may be a microcontroller and/or microcontroller unit (MCU) having a processor or processor core and non-transitory memory with program code instructions stored therein which, when executed by the processor, generates the control signals at the controller outputs for controlling SMPSs 12, 14 to perform as an interleaved SMPS. It is understood that controller 16 may be implemented in any of a number of different processor, microprocessor or controller architectures. For instance, the memory, which may be volatile memory, nonvolatile memory or both volatile and nonvolatile memory, may be partly or wholly external to controller 16 and accessible thereby. During operation as an interleaved SMPS, SMPSs 12 and 14 each outputs a voltage output signal which is connected to a load L. In an example embodiment, the voltage output signal is a DC voltage.

Figure 2:
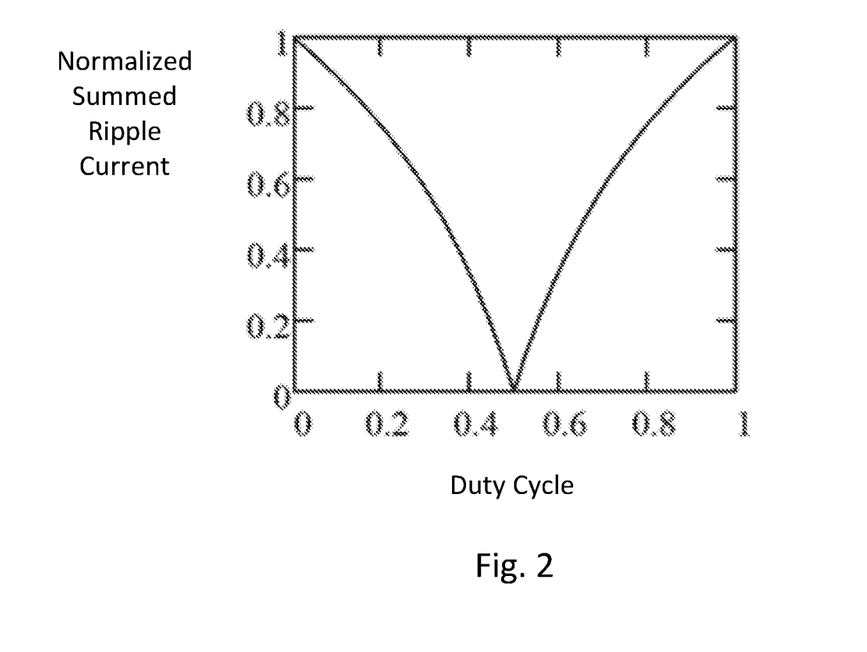
FIG. 2 is a graph of normalized summed ripple current versus duty cycle for the dual interleaved SMPS apparatus of FIG. 1.

FIG. 2 shows the calculated amplitude of the summed ripple current versus duty cycle for SMPS apparatus 10, according to an example embodiment. The graph is normalized where "1" is the ripple current amplitude of each individual phase. As can be seen from the figure, the summed ripple current of SMPS apparatus 10 is minimum at 50% duty cycle where the summed ripple current amplitude is 0, and is maximum as duty cycle approaches 0 or 100%, where the amplitude of the summed ripple current is equal to the individual phase ripple current amplitude.

Figure 3:
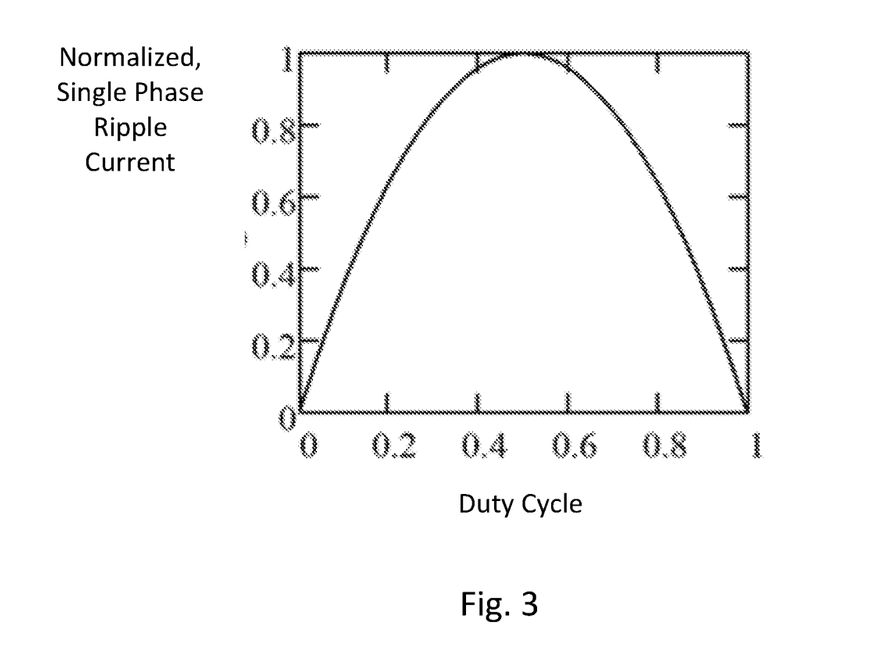
FIG. 3 is a graph of normalized singe phase ripple current versus duty cycle for a SMPS.

FIG. 2 assumes ripple current amplitude of an individual phase is constant across all duty cycles. An SMPS 12 or 14 inherently has different ripple current amplitudes at different duty cycles. This is due to the voltage applied across the SMPS inductor changing at various duty cycles to maintain volt-second balance. FIG. 3 shows the normalized, single phase ripple current amplitude versus duty cycle of a typical SMPS. As shown, the ripple current amplitude is maximum at 50% duty cycle and zero at 100% and 0% duty cycle.

Figure 4:
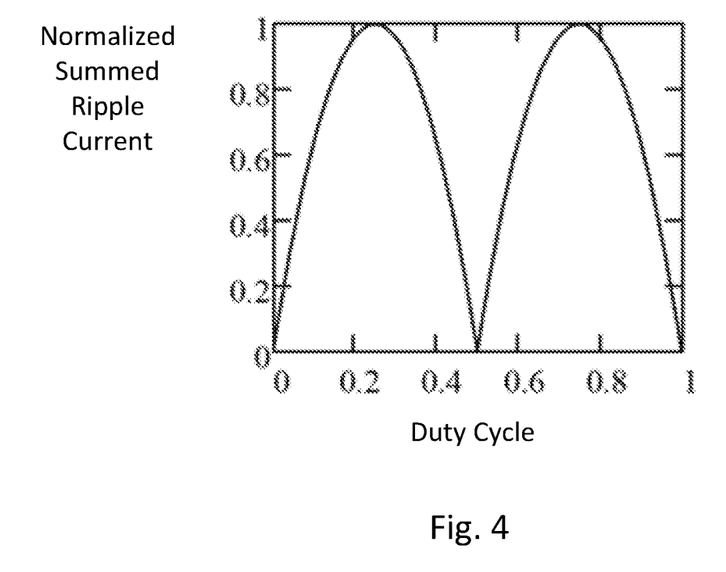
FIG. 4 is a graph of normalized summed ripple current versus duty cycle for the dual interleaved SMPS of FIG. 1.

Combining the interleaving cancellation factor versus duty cycle of FIG. 2 with the variation of individual phase amplitude versus duty cycle in FIG. 3 results in the normalized, summed ripple current in SMPS apparatus 10 shown in FIG. 4. The summed ripple current reaches its peak value at 25% duty cycle and 75% duty cycle and is zero at 0, 50%, and 100% duty cycles.

Figure 5:
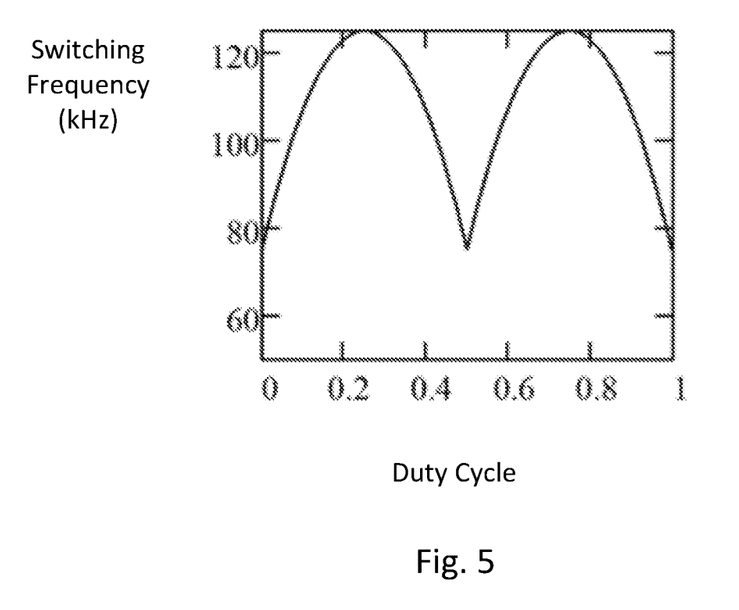
FIG. 5 is a graph of switching frequency versus duty cycle in the dual interleaved SMPS apparatus of FIG. 1.

In order to maintain the same peak ripple current amplitude compared to a fixed frequency, dual interleaved SMPS, in an example embodiment the switching frequency of SMPS apparatus 10 remains at the fixed frequency at 25% and 75% duty cycles, but for all other duty cycles the switching frequency is reduced proportionally according to the relationship between switching frequency and duty cycle shown in FIG. 5. In the example embodiment in which SMPS apparatus 10 uses 125 kHz maximum switching frequency and 75 kHz minimum switching frequency, the relation of switching frequency and duty cycle is show in FIG. 5. As illustrated in the graph of FIG. 5, the switching frequency is highest at 25% and 75% duty cycle and lowest at 0%, 50% and 100% duty cycle. The switching frequency gradually changes between 0% and 25% duty cycle, between 25% and 50% duty cycle, between 50% and 75% duty cycle and between 75% duty cycle and 100% duty cycle. The exact frequency modulation range may be adjusted based on individual SMPS circuit design requirements, but the overall proportionality between frequency and duty cycle follows the switching frequency—duty cycle relationship of FIG. 5.

Figure 6:
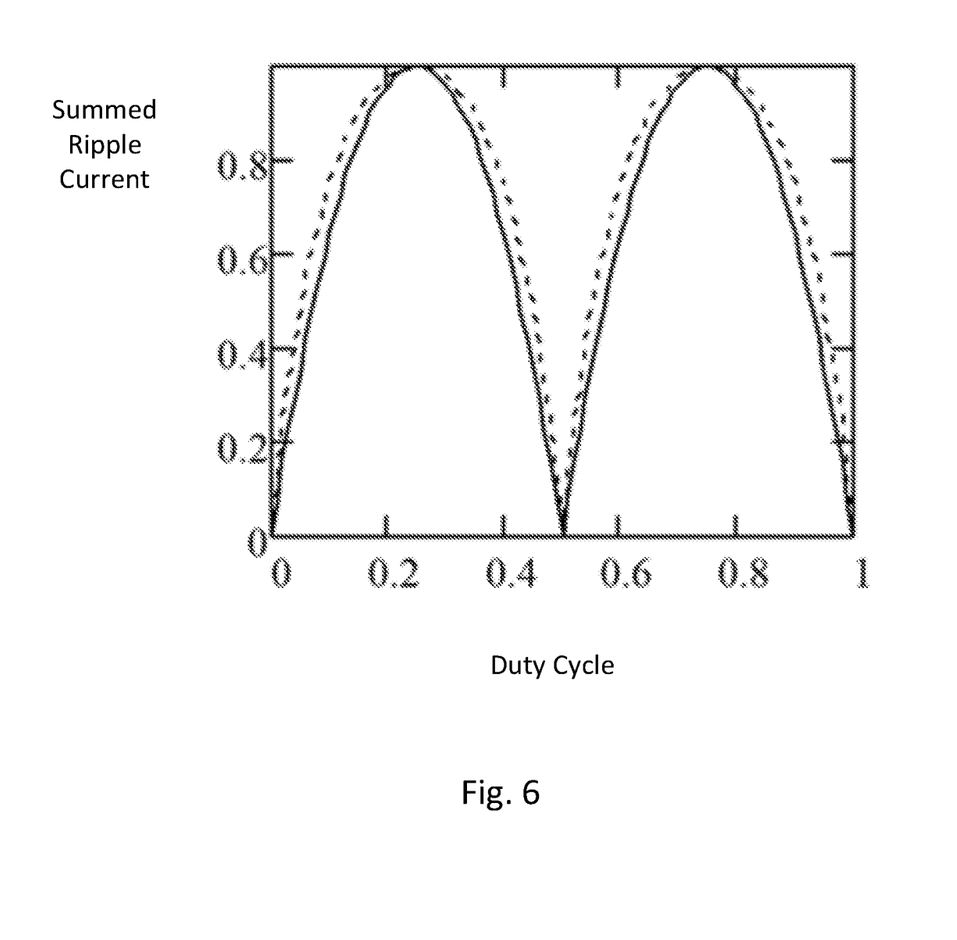
FIG. 6 is a graph of summed ripple current for a fixed frequency dual interleaved SMPS versus duty cycle and a graph of summed ripple current for the dual interleaved SMPS apparatus of FIG. 1.

FIG. 6 shows the normalized summed ripple current of a dual interleaved SMPS having fixed 125 kHz switching frequency (shown as the solid curve), and the disclosed variable 75 kHz-125 kHz switching frequency scheme discussed above in the example embodiment (shown as the dashed curve). The variable frequency method has higher ripple current in most duty cycles but maintains the same maximum ripple amplitude of the fixed frequency method at 25% and 75% duty cycles. Lowering the switching frequency of SMPS apparatus 10 at duty cycles other than 25% and 75% reduces the total losses of the switching devices in SMPS apparatus 10.

Figure 7:
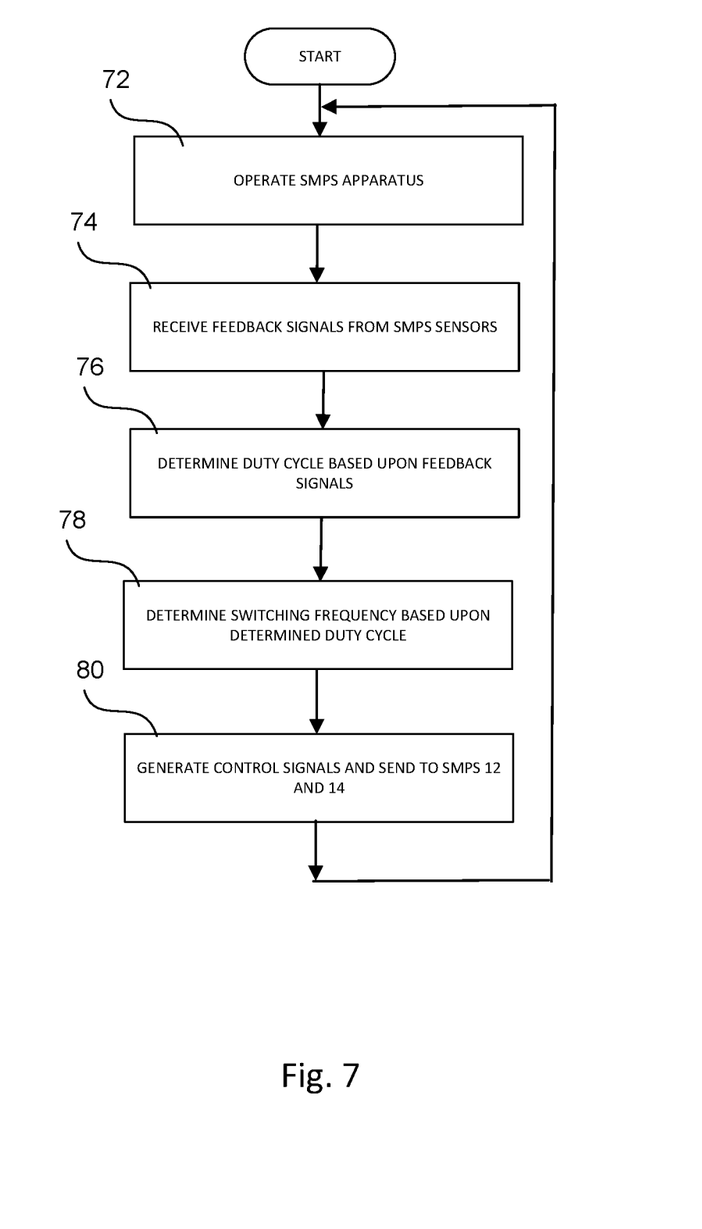
FIG. 7 is a flowchart illustrating a method of operating an interleaved SMPS apparatus according to an example embodiment.

FIG. 7 illustrates a method of operating SMPS apparatus 10 according to an example embodiment. At 72, controller 16 controls SMPSs 12 and 14 to operate as a dual interleaved SMPS apparatus. As part of such control, controller 16 provides control signals to SMPSs 12, 14, as discussed above. During operation of SMPS apparatus 10, controller 16 receives at 74 feedback signals from sensors located in or around SMPSs 12 and 14. Based at least partly upon the received feedback signals, controller 16 determines at 76 the duty cycle for SMPSs 12 and 14. The determined duty cycle matches power supply input voltage changes to meet power factor correction capabilities. At 78, controller 16 determines the switching frequency based upon the determined duty cycle. The relationship between switching frequency and duty cycle, as shown in FIG. 5, may be stored in the above-mentioned memory in the form of a lookup table, an equation, etc. which is accessed by controller 16 in determining the switching frequency. Upon determining the duty cycle and switching frequency, at 80 controller 16 generates the output control signals accordingly and sends the control signals to SMPSs 12 and 14.

As mentioned above, by using a faster switching frequency where interleaving is least effective at reducing ripple and using a slower switching frequency where interleaving is most effective, total switching losses are reduced without increasing the peak ripple current amplitude compared to a SMPS with a fixed frequency. Another added benefit provided by the example embodiments is that the frequency of the ripple current is not fixed at one value. Because a power factor correction SMPS constantly changes duty cycle to match the input voltage changes, and because the switching frequency of the interleaved SMPS now is a function of duty cycle, the switching frequency is also constantly changing. Variable switching frequency spreads the energy of the ripple current across a band of frequencies instead of concentrating it at a single frequency, commonly referred to as frequency modulation pulse width modulation (FMPWM) or spread spectrum. This reduces the measured EMC signature of any given frequency.

The interleaved SMPS apparatus described above may be utilized in a number of applications. For example, the described interleaved SMPS may be used in an onboard charging system for charging batteries in an electric or hybrid electric vehicle in which the apparatus receives at its input the voltage appearing at the AC mains and generates a DC output for charging the vehicle batteries.

As mentioned, the example embodiment discussed above is for a dual interleaved SMPS apparatus but that more than two parallel SMPSs may be used in the interleaved SMPS apparatus. For any number of SMPs in parallel, the switching frequency is highest at $$D=n/(N\text{-phases}*2),$$

where D is duty cycle, "N-phases" is the number of switched mode power supplies, and n are odd integers between one and 2*(N-phases). The switching frequency is lowest at $$D=n/(N\text{-phases}),$$

where D is duty cycle, "N-phases" is the number of switched mode power supplies, and n are integers between zero and (N-phases). For example, for an interleaved SMPS apparatus having three SMPSs in parallel, the number of duty cycle percentages at which the switching frequency is highest is three (at 16.67, 50, and 83.33 percent duty cycle)

and the number of duty cycle percentages at which the switching frequency is lowest is four (at 0, 33.33, 66.66 and 100 percent duty cycle). For an interleaved SMPS apparatus having four SMPSs in parallel, the number of duty cycle percentages at which the switching frequency is highest is four (at 12.5, 37.5, 62.5 and 87.5 percent duty cycle) and the number of duty cycle percentages at which the switching frequency is lowest is five (at 0, 25, 50, 75 and 100 percent duty cycle).

Figure 8:
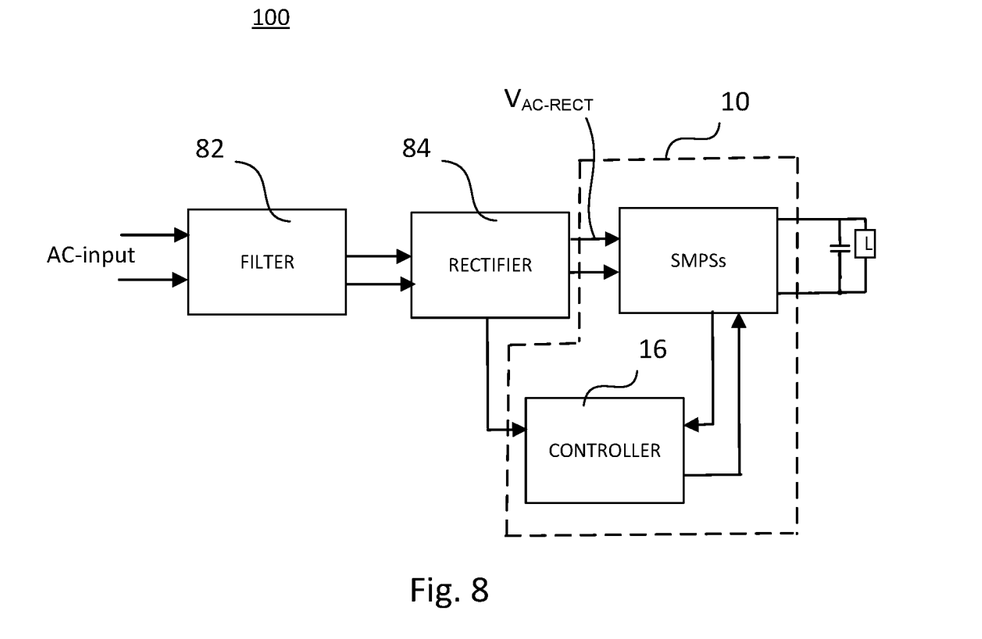
FIG. 8 is a block diagram of a PFC circuit of an onboard charging system utilizing the interleaved SMPS apparatus of FIG. 1, according to an example embodiment.

As mentioned, interleaved SMPS apparatus 10 may form part of a PFC converter circuit 100, such as a PFC circuit of an onboard charging system for a motor vehicle. Referring to FIG. 8, a PFC converter circuit 100 incorporating the interleaved SMPS apparatus 10 may include an input filter circuit 82 having input terminals coupled to the AC voltage input of the PFC converter circuit; and a rectifier circuit 84, such as a bridge rectifier circuit, having input terminals connected to the output terminals of the input filter circuit 82 and output terminals coupled to the voltage input terminals of each SMPS, such as SMPSs 12, 14. The rectifier circuit 84 provides a rectified AC voltage signal, $V_{AC-RECT}$, to the SMPSs 12, 14 which form the interleaved SMPS apparatus 10. It is understood that PFC converter circuit 100 may utilize any of a number of known bridge and rectifier circuits, topologies and/or architectures. As mentioned, each SMPS 12, 14 may be implemented using any one of a number of different known topologies and/or architectures. For example, SMPSs 12, 14 may utilize a bridgeless totem pole (BTP) boost topology in which the boost inductor is moved to the input side of the SMPS and diodes with active switches are connected to the inductor. In a BTP boost implementation, no rectifier circuit 84 is needed.

The example embodiments have been described herein in an illustrative manner, and it is to be understood that the terminology which has been used is intended to be in the nature of words of description rather than of limitation. Obviously, many modifications and variations of the invention are possible in light of the above teachings. The description above is merely exemplary in nature and, thus, variations may be made thereto without departing from the spirit and scope of the invention as defined in the appended claims.

What is claimed is:

1. An interleaved switched mode power supply apparatus, comprising:
    a plurality of parallel-connected switched mode power supplies comprising at least a first switched mode power supply having supply input terminals to receive a supply input voltage and a second switched mode power supply having supply input terminals to receive the supply input voltage; and
    a controller having at least one first output coupled to at least one control input of the first switched mode power supply, and at least one second output coupled to at least one control input of the second switched mode power supply, the controller is configured to control the first and second switched mode power supplies so that the controller and the first and second switched mode power supplies comprise an interleaved switched mode power supply with power factor correction,
    wherein the controller is configured to modulate a switching frequency of each of the first and second switched mode power supplies such that the switching frequency varies based upon ripple current cancellation between the ripple current of the first switched mode power supply and the ripple current of the second switched mode power supply.

2. The interleaved switched mode power supply apparatus of claim 1, wherein the switching frequency of the first and second switched mode power supplies varies based upon duty cycle thereof.

3. The interleaved switched mode power supply apparatus of claim 2, wherein the controller is configured to determine the duty cycle of the first and second switched mode power supplies based at least partly upon the supply input voltage, and determine the switching frequency of the first and second switched mode power supplies based upon the determined duty cycle.

4. The interleaved switched mode power supply apparatus of claim 3, further comprising a non-transitory memory that is part of or coupled to the controller, the non-transitory memory having stored therein data corresponding to a relationship between duty cycle and switching frequency.

5. The interleaved switched mode power supply apparatus of claim 4, wherein the data is in the form of a lookup table stored in the non-transitory memory.

6. The interleaved switched mode power supply apparatus of claim 4, wherein the data is in the form of an equation for the relationship between the duty cycle and the switching frequency.

7. The interleaved switched mode power supply apparatus of claim 2, wherein the determined switching frequency is highest at $$D=n/(N\text{-phases}*2),$$

where D is duty cycle, "N-phases" is the number of switched mode power supplies, and n are odd integers between one and 2*(N-phases).

8. The interleaved switched mode power supply apparatus of claim 2, wherein the determined switching frequency is lowest at $$D=n/(N\text{-phases}),$$

where D is duty cycle, "N-phases" is the number of switched mode power supplies, and n are integers between zero and N-phases.

9. The interleaved switched mode power supply apparatus of claim 1, further comprising a third switched mode power supply having supply input terminals to receive the supply input voltage, wherein the controller is configured to modulate the switching frequency of each of the first, second and third switched mode power supplies such that the switching frequency varies based upon ripple current cancellation between the ripple current of the first, second and third switched mode power supplies.

10. The interleaved switched mode power supply apparatus of claim 1, wherein a summed ripple current at at least two predetermined duty cycles is the same as a summed ripple current for interleaved switched mode power supplies operating at a fixed switching frequency, and the summed ripple current of the interleaved switched mode power supply apparatus at duty cycles other than at the at least two predetermined duty cycles is different from the summed ripple current for the interleaved switched mode power supplies operating at the fixed switching frequency.

11. The interleaved switched mode power supply apparatus of claim 1, wherein the interleaved switched mode power supply apparatus forms at least part of an onboard battery charging apparatus for a vehicle and the supply input voltage is an AC voltage.

12. A method for controlling interleaved switched mode power supply apparatus having a plurality of parallel-connected switched mode power supplies, the method comprising:

receiving an input supply voltage;

modulating, by a controller, a switching frequency of the switched mode power supplies based upon the received input supply voltage;

determining, by the controller, a duty cycle for the switched mode power supplies based upon the received input supply voltage;

determining, by the controller, a switching frequency for the switched mode power supplies based upon the determined duty cycle; and controlling, by the controller, the switched mode power supplies using the determined duty cycle and the determined switching frequency, wherein modulating the switching frequency forms part of controlling the switched mode power supplies.

13. The method of claim 12, wherein determining the switching frequency comprises accessing data stored in non-transitory memory of or associated with the controller which provides a relationship between duty cycle and switching frequency.

14. The method of claim 13, wherein the data is in the form of a lookup table.

15. The method of claim 13, wherein the data is in the form of an equation describing the relationship between the duty cycle and the switching frequency.

16. The method of claim 12, wherein the determined switching frequency is highest at $$D=n/(N\text{-phases}*2),$$

where D is duty cycle, "N-phases" is the number of switched mode power supplies, and n are odd integers between one and 2*(N-phases).

17. The method of claim 12, wherein the determined switching frequency is lowest at $$D=n/(N\text{-phases}),$$

where D is duty cycle, "N-phases" is the number of switched mode power supplies, and n are integers between zero and N-phases.

18. A computer program product stored in non-transitory memory having instructions which, when executed by a controller of an interleaved switched mode power supply, causes the controller to perform a method comprising:

receiving an indication of an input supply voltage;

modulating a switching frequency of the interleaved switched mode power supplies based upon the input supply voltage;

determine a duty cycle for the interleaved switched mode power supplies based upon the received input supply voltage;

determine a switching frequency for the interleaved switched mode power supplies based upon the determined duty cycle; and control the interleaved switched mode power supply using the determined duty cycle and the determined switching frequency, wherein modulating the switching frequency forms part of controlling the interleaved switched mode power supplies.

* * * * *